United States Patent
Hoffmann

(10) Patent No.: US 7,318,453 B2
(45) Date of Patent: Jan. 15, 2008

(54) SPACING AND CENTERING DEVICE FOR A RIGID DOUBLE-WALL DUCT WITH A LOW HEAT TRANSFER COEFFICIENT

(75) Inventor: Philippe Hoffmann, Paris (FR)

(73) Assignee: Technip France (FR)

( * ) Notice: Subject to any disclaimer, the term of this patent is extended or adjusted under 35 U.S.C. 154(b) by 0 days.

(21) Appl. No.: 10/570,710

(22) PCT Filed: Sep. 1, 2004

(86) PCT No.: PCT/FR2004/002229

§ 371 (c)(1),
(2), (4) Date: Apr. 26, 2006

(87) PCT Pub. No.: WO2005/028938

PCT Pub. Date: Mar. 31, 2005

(65) Prior Publication Data

US 2006/0237084 A1   Oct. 26, 2006

(30) Foreign Application Priority Data

Sep. 8, 2003   (FR) .................................. 03 10563

(51) Int. Cl.
*F16L 9/18* (2006.01)
(52) U.S. Cl. .................. 138/112; 138/108; 138/148
(58) Field of Classification Search ................ 138/112, 138/108, 148

See application file for complete search history.

(56) References Cited

U.S. PATENT DOCUMENTS

| | | | |
|---|---|---|---|
| 4,162,093 A * | 7/1979 | Sigmund | 285/47 |
| 4,531,551 A * | 7/1985 | Eichelberger et al. | 138/129 |
| 5,156,895 A | 10/1992 | Martin | 428/76 |
| 5,404,914 A * | 4/1995 | Ziu | 138/113 |
| 5,592,975 A * | 1/1997 | Wissmann et al. | 138/112 |
| 5,743,302 A | 4/1998 | McNeely | 138/113 |
| 6,015,015 A | 1/2000 | Luft et al. | 166/384 |
| 6,216,745 B1 * | 4/2001 | Augustynowicz et al. | 138/149 |
| 6,305,429 B1 * | 10/2001 | Welch et al. | 138/149 |
| 6,562,401 B2 | 5/2003 | Eaton | 427/195 |
| 2005/0047871 A1 * | 3/2005 | Lee et al. | 405/154.1 |
| 2006/0196568 A1 * | 9/2006 | Leeser et al. | 138/149 |
| 2006/0272727 A1 * | 12/2006 | Dinon et al. | 138/149 |

FOREIGN PATENT DOCUMENTS

GB   2 370 870 A   7/2002

* cited by examiner

*Primary Examiner*—James Hook
(74) *Attorney, Agent, or Firm*—Ostrolenk, Faber, Gerb & Soffen, LLP

(57) ABSTRACT

A spacing and centering device for a rigid double-wall duct, for example of the winding type, which is intended for the transport of hydrocarbons. The rigid duct comprises two coaxial tubes which are separated by an annular space. The spacing and centering device is housed in the annular space in order to maintain a distance between the two coaxial tubes. An element made from a material having low heat conductivity and comprising an aerogel element is at least partially covered with a casing of polymer-type plastic material.

9 Claims, 5 Drawing Sheets

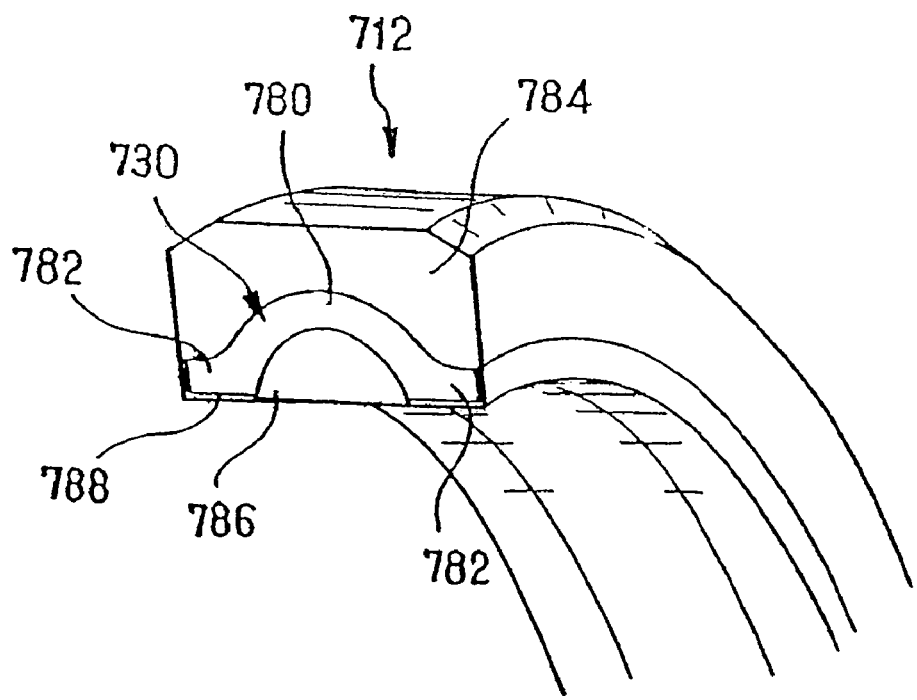
FIG_7
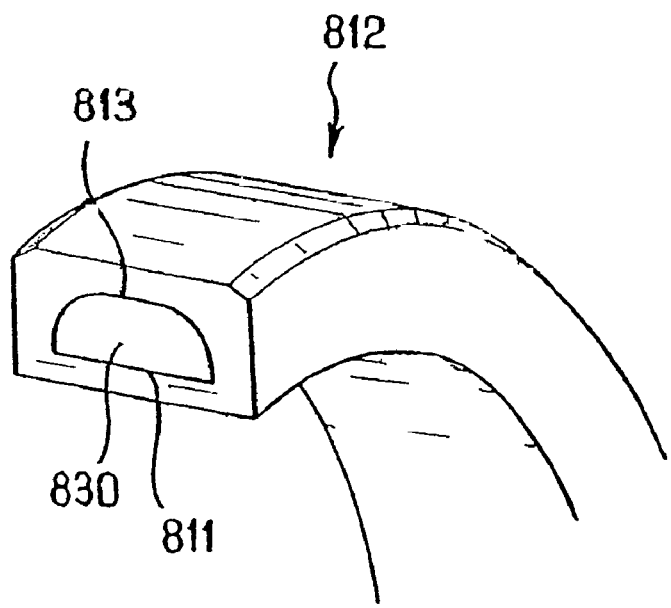
FIG_8

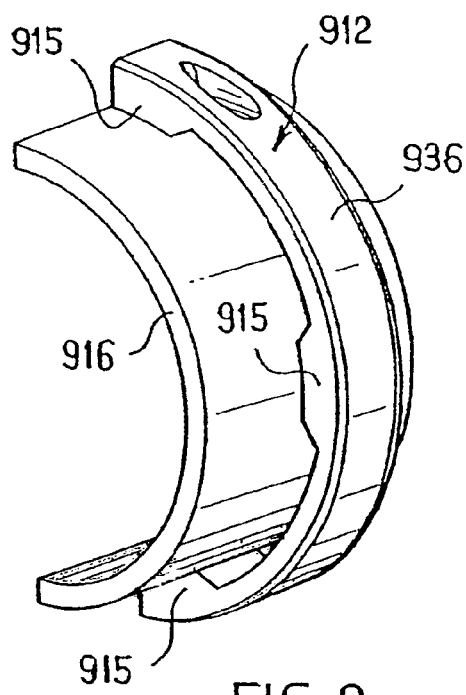
FIG_9
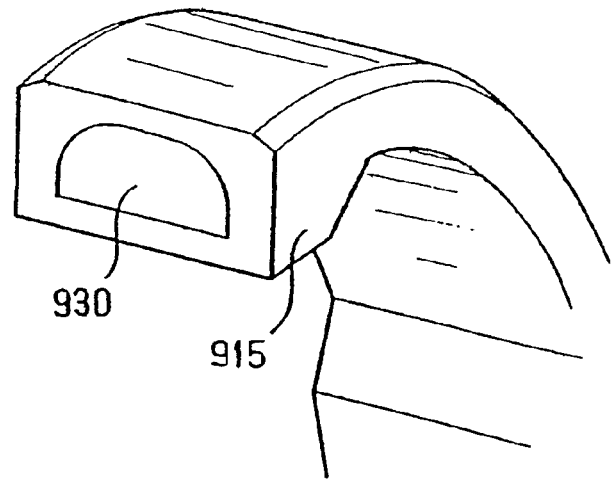
FIG_10
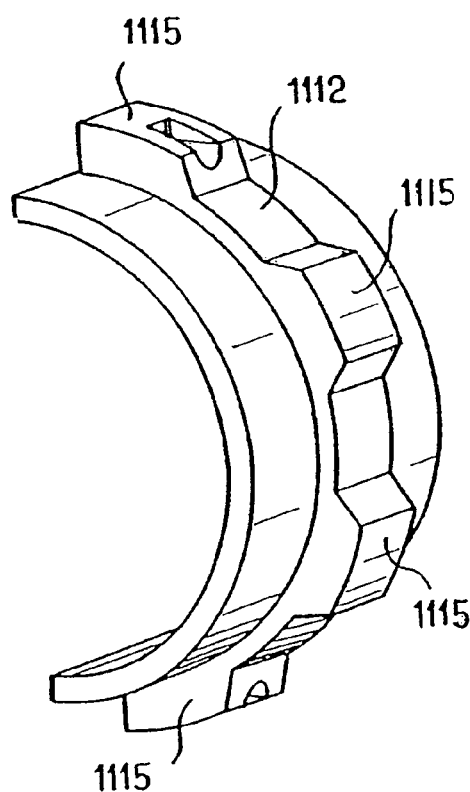
FIG_11
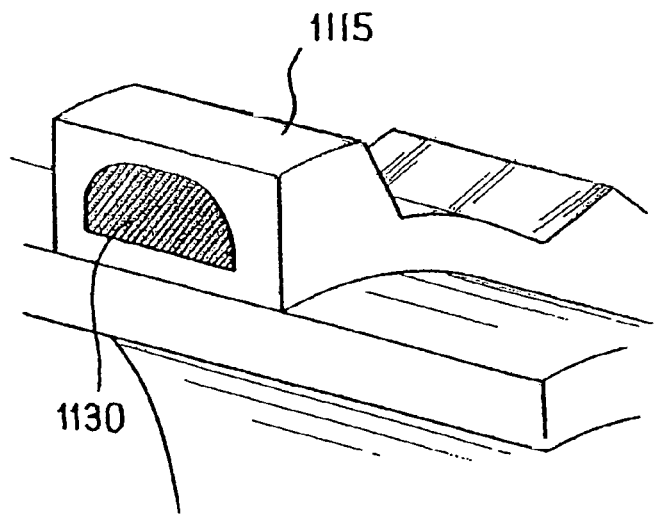
FIG_12

SPACING AND CENTERING DEVICE FOR A RIGID DOUBLE-WALL DUCT WITH A LOW HEAT TRANSFER COEFFICIENT

CROSS REFERENCE TO RELATED APPLICATION

The present application is a 35 U.S.C. §§ 371 national phase conversion of PCT/FR2004/0022229, filed 1 Sep. 2004, which claims priority of French Application No. 0310563, filed 8 Sep. 2003. The PCT International Application was published in the French language.

BACKGROUND OF THE INVENTION

The present invention relates to a spacing and centering device, in particular for rigid pipe-in-pipe systems intended for the transport of hydrocarbons.

Rigid pipes of this type comprise two coaxial tubes, a rigid external tube or carrier pipe and a rigid internal tube or flowline, which are separated by an annular space, said spacing and centering device, or distance piece, being accommodated in said annular space in order to hold the two coaxial tubes at a distance from one another.

These pipes are intended to be installed on the ocean bed by means of a laying vessel and in particular by a method known as the "reeled pipe" technique.

Pipe-in-pipe systems are typically used for underwater production lines, in particular for the transport of hydrocarbons, and it is necessary to insulate them because the heavy oils have a tendency to solidify while cooling during their transfer from the bed toward the surface. Insulation is also necessary in order to avoid the formation of hydrates, which can appear when certain types of crude oil cool down, for example when production is interrupted.

Heat insulation is effected by filling the annular space of the pipe with a material with low heat conductivity.

Furthermore, the pipe-in-pipe systems are made so that their annular space is dry in order to improve heat insulation performance. The annular space can also be kept at atmospheric pressure so that said material is subjected neither to the hydrostatic pressure to which the carrier pipe is subjected nor to the pressure of the hydrocarbon flowing in the internal pipe. Rigid pipe-in-pipe systems thus make it possible to use a great variety of materials with low heat conductivity which afford good insulation.

Conventionally, two main techniques are used for laying submarine pipes from a laying vessel, the J-lay or S-lay method and the "reeled pipe" technique.

In the first technique, the pipe is assembled on the vessel by welding lengths of tube end to end before laying on the seabed. This technique is slow and costly and requires a team of welders on board the laying vessel.

The "reeled pipe" technique comprises a stage of assembly of the pipe on land and a stage of winding up on a reel which is then transported to the production site where it is unwound along the planned location. This laying technique makes it possible to mobilize the laying vessel for a shorter period than for the J-lay method.

In the "reeled pipe" technique, the rigid pipe is deformed plastically when it is wound up on the reel, and this plastic deformation is eliminated by a straightening mechanism when the pipe is unwound. During winding up, tension is applied to the pipe in order to shape the external pipe to the reel. The external pipe is thus curved by contact with the reel or with the pipe layers already wound up.

During the winding-up and unwinding operations, the flexion forces are transferred from the carrier pipe to the flowline by the distance pieces or annular walls arranged along the pipe in the annular space. During unwinding, the pipe is straightened, the external pipe being drawn through straightening means, such as opposite rollers or an assembly of straightening tensioners (well known to the person skilled in the art). The straightening forces are applied to the exterior of the carrier pipe and are transferred to the flowline solely by means of the spacing and centering devices.

As the distribution of these devices is discontinuous along the pipe-in-pipe, straightening of the flowline takes place locally and is therefore not complete. The flowline thus has residual curves after straightening which depend on the spacing of the distance pieces in the annular space. The consequence of the resultant relative displacement of the flowline in the carrier pipe is local reductions in the annular space present between the two tubes, which leads to potential compression of the material with low heat conductivity which insulates the pipe.

With the application of the "reeled pipe" techniques to pipe-in-pipe systems, continuous lengths of insulating material must be separated by distance pieces and the spacing of the distance pieces must be sufficiently small for it to be possible to transmit the flexion forces from the carrier pipe to the flowline and for local reductions in the annular space between the two tubes to be avoided.

When the heat insulating material is of the half-shell type, the local compression of the insulating material leads to a reduction in the insulating properties and overall to a reduction in the insulating properties of the pipe. In order to compensate for this loss, it is necessary to add distance pieces and to move them closer to one another in order to prevent compression of the insulating material.

However, adding extra distance pieces, the heat insulation capacity of which is low in relation to the insulating materials used, necessarily reduces the total quantity of heat insulating material and consequently the heat insulation of the pipe.

It is also possible to modify the form of the pipe by increasing the diameter of the carrier pipe and/or reducing the diameter of the flowline in order that the quantities of insulating material can be increased, but such a solution gives rise to other problems, in particular that of modifying the diameters of common standard tubes, which increases costs and/or reduces the capacities of the pipe.

It is therefore an object of the present invention to provide a rigid pipe-in-pipe having increased insulation properties which is capable of being wound up and unwound during laying by means of the usual straightening techniques.

SUMMARY OF THE INVENTION

To this end, according to a first object, the present invention proposes a spacing and centering device for a rigid pipe-in-pipe of the type which can be wound up, intended for the transport of hydrocarbons, said rigid pipe comprising two coaxial tubes which are separated by an annular space, said spacing and centering device being accommodated in said annular space in order to hold the two coaxial tubes at a distance from one another, said spacing and centering device comprising an element made of material with low heat conductivity consisting of an aerogel, said element being at least partially covered with a casing made of polymer-type plastic material.

A characteristic of the invention thus lies in the use of aerogel for forming the spacing and centering device, the heat conductivity of the aerogel being low and for example less than 0.1 W/mK.

Therefore, not only is said element heat-insulating, but its mechanical strength, and in particular its compression strength, which is for example greater than 10 MPa, is moreover such that the overall mechanical properties of said spacing and centering device are comparable with the distance pieces described in the prior art.

The overall insulation gain of the pipe in relation to a pipe according to the prior art where the spacing and centering devices consist of a piece made of plastic material, for example polyamide, is therefore in the order of 15 to 20%.

Moreover, at the time of production of the pipe, during which for example 1 km of internal pipe equipped with said spacing and centering devices is inserted into the external pipe consisting of tubes assembled by welding, said devices, in friction against the internal wall of the external pipe, suffer wear in a not inconsiderable way, in particular at the welds which extend projecting slightly from said internal wall. In order to protect said element from the abrasion due to the relative displacements of the two tubes and said spacing and centering device, it is covered, at least on the contact surfaces, with a casing made of plastic material which is advantageously resistant to abrasion but also to mechanical aggression and in particular to impacts. This plastic material is polyamide, for example.

Said element is preferably formed from two arc-shaped half-pieces, the free ends of the two half-pieces being respectively adapted to be connected together by connection means. Mounting is therefore facilitated thereby because it is necessary only to assemble the two half-pieces by respectively adjusting their free ends together to enclose the flowline by implementing said connection means. The latter are formed for example by fashioning tangential bores in the free ends and introducing into them screwable elements which will be described in greater detail in the continuation of the description.

According to another object, the present invention proposes a rigid pipe-in-pipe which can be wound up, comprising a plurality of spacing and centering devices as described above, which are spaced from one another along said rigid pipe.

By virtue of said spacing and centering devices, said rigid pipe-in-pipe is thus adapted to be installed, in particular according to the technique known as "reeled pipe", without the annular space being deformed thereby and therefore with the overall insulating properties of the pipe being preserved.

To achieve this and in a particularly advantageous way, the spacing and centering devices are spaced in said annular space by a distance of less than five meters, and the annular space is advantageously filled with a material with low heat conductivity between said spacing and centering devices.

Moreover, by virtue of the arrangement of the spacing and centering devices, the average heat transfer coefficient of said pipe is advantageously less than 11/10, preferably 10.5/10, of the heat transfer coefficient of a portion of pipe in the annulus of which said material with low heat conductivity extends. Said pipe is therefore well heat-insulated because the spacing and centering devices according to the invention have insulating properties and provide the pipe with insulation which approaches that of a pipe of which the annular space is entirely filled with insulating material without any spacing and centering device. Heat exchange between the interior of the pipe and the exterior is therefore low in contrast to the pipes of the prior art where the distance pieces used formed heat bridges between the interior and the exterior of the pipe.

BRIEFS DESCRIPTION OF THE DRAWINGS

Other features and advantages of the invention will emerge from reading the description given below of particular embodiments of the invention, provided by way of non-limiting example, with reference to the accompanying drawings, in which:

FIG. 7 is a partial diagrammatic view in radial section showing a device according to the invention according to a first variant embodiment;

FIG. 8 is a partial diagrammatic view in radial section showing a device according to the invention according to a second variant embodiment;

FIG. 9 is a partial diagrammatic view in perspective of a device according to the invention according to a third variant embodiment;

FIG. 10 is a view in radial section of the device shown in FIG. 9;

FIG. 11 is a partial diagrammatic view in perspective of a device according to the invention according to a fourth variant embodiment, and FIG. 12 is a view in radial section of the device shown in FIG. 11.

Similar or identical elements which serve the same function in FIGS. 1, 2, 5 and 6 have the same number preceded by the number of the figure in question.

DESCRIPTION OF THE PREFERRED EMBODIMENTS

Figure 1:
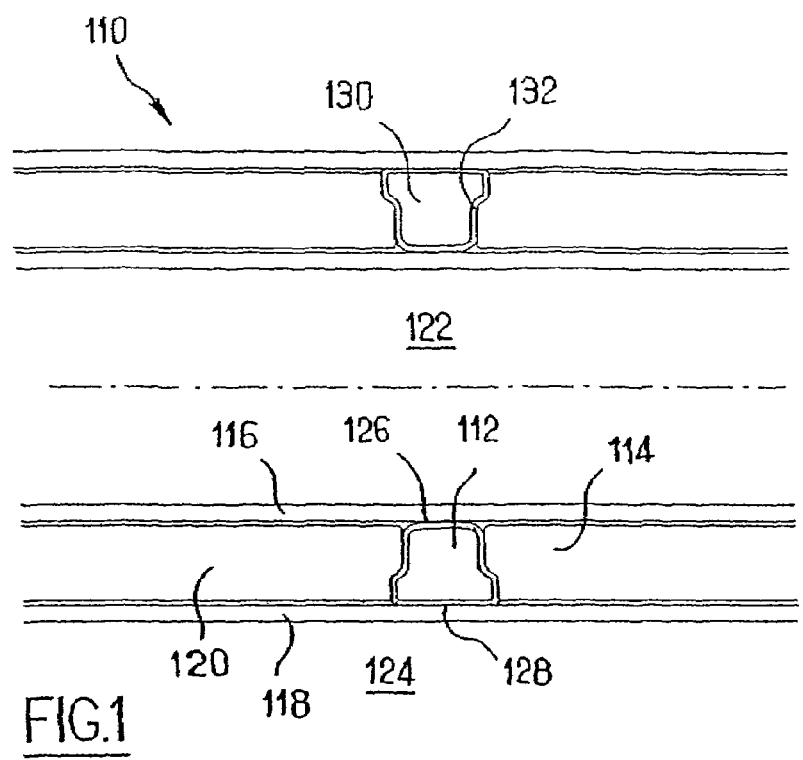
FIG. 1 is a partial diagrammatic view in longitudinal section of a rigid pipe-in-pipe according to the invention.

FIG. 1 illustrates a portion of rigid pipe-in-pipe 110 comprising a spacing and centering device 112 according to the invention consisting of an annular distance piece which is accommodated in the annular space 114 between two coaxial rigid tubes, a carrier pipe 118 and a flowline 116. Moreover, the annular space 114 is filled with a material with low heat conductivity 120 suitable for heat-insulating the interior 122 of the flowline 116 which is intended to convey a fluid, for example hydrocarbons. This heat insulation is provided between the interior 122 and the exterior 124 so that certain compounds do not undergo physical transformations while cooling during transport along the pipe. Paraffins, for example, which are capable of congealing while cooling, and/or hydrates, which can precipitate and lead to the pipe becoming blocked.

The annular distance piece 112 is shown in section here, an external surface 128 extending facing the carrier pipe 118, preferably spaced from the carrier pipe, while an internal surface 126 of the annular distance piece 112 is supported on the flowline 116 so as to hold the two tubes 116, 118 at a distance from one another. The annular distance piece 112 is advantageously mounted in a fixed position on the flowline 116 which is then inserted into the carrier pipe 118, a functional play being provided between the annular distance piece 112 and the carrier pipe 118.

The annular distance piece 112 comprises an element 130 in the form of a ring made from a material with low heat conductivity and at least partially covered with a casing 132 made of plastic material.

The element 130 is made from a material with very great heat insulation characteristics of the aerogel type, organic or inorganic, and it has a plastic material molded over it, for example polyamide, which is resistant to abrasion and to the various mechanical stresses such as impacts, compression or shear.

An aerogel is made from a gel which has been dried in order to remove its solvent and to preserve the structure of the solid as it was established in the original gel. The solvent has been replaced by air during drying, and the initial gel then forms a solid.

An aerogel of inorganic type, for example an aerogel of monolithic silicon, thus has a density of in the region of 0.1 g/cm$^3$ and a solid percentage of in the region of 5%.

The rigid aerogel used here is inorganic for example, and its heat conductivity is lower than 0.1 W/mK, for example 0.012 W/mK.

Moreover, in spite of its low density, its compression strength is high, greater than 10 MPa, for example 100 MPa, so that after overmolding, it is suitable for resisting the stresses exerted by the two tubes 116, 118 being brought closer during winding-up and then unwinding of the pipe and, more particularly, it is suitable for transmitting the radial forces from the external pipe toward the internal pipe.

By virtue of its heat conductivity, which is 10 or 100 times lower than that of the plastic materials currently used for producing distance pieces according to the prior art, the overall heat losses of the pipe 110 by way of the annular distance piece 112 are thus greatly attenuated, in the order of 20 to 30%.

Figure 2:
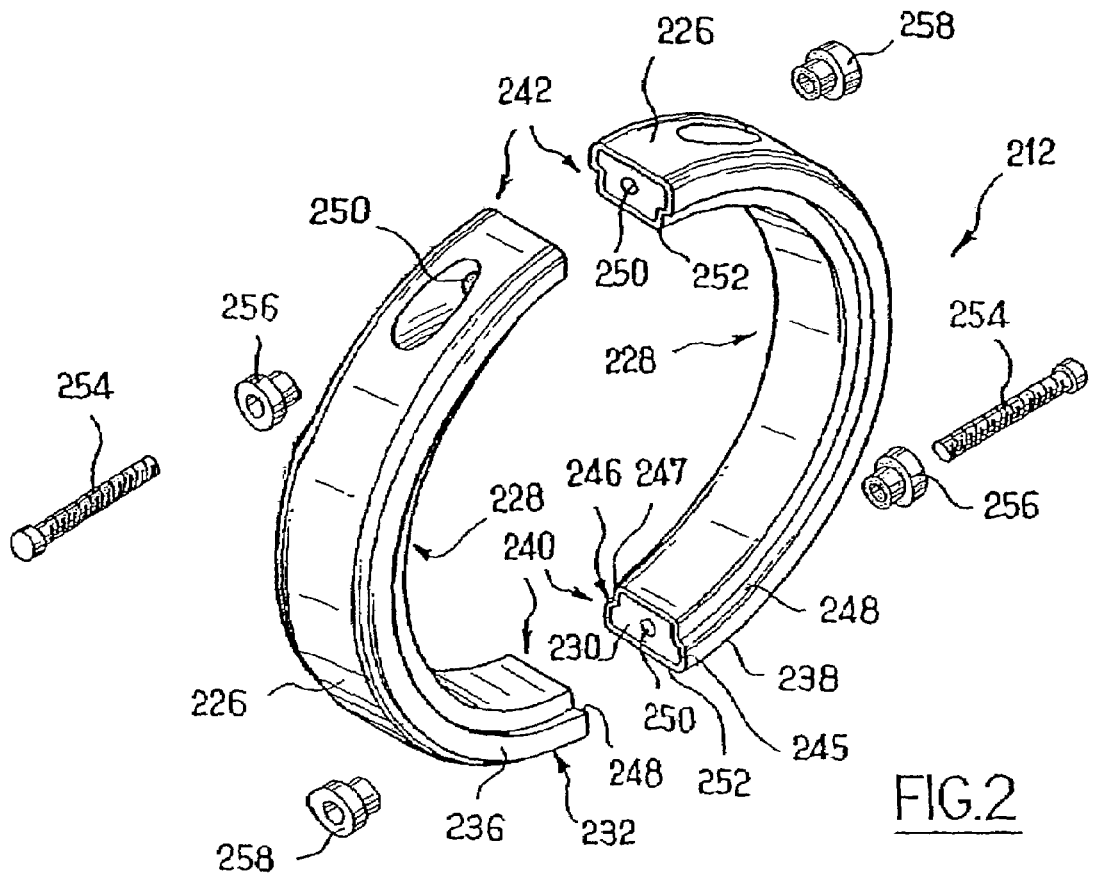
FIG. 2 is a detailed diagrammatic perspective view of a device according to the invention.

With reference to FIG. 2, a way of connecting the device according to the invention to the flowline and according to a particular form of the annular distance piece will be described.

The annular distance piece 212 consists of two arc-shaped half-pieces 236, 238 which are symmetrical with one another, their concave parts facing so as to be capable of enclosing a flowline. The two half-pieces each have two free ends 240, 242 which are capable of being connected by connection means, to be described, in order to form the annular distance piece 212. Each of the half-pieces 236, 238 comprises an element 230 in the form of a half-ring which is made from a material with low heat conductivity and covered with a casing 232 made of plastic material.

In radial section, the two half-pieces have two superposed parts, an external part 245 defining an external surface 226 and an internal, less wide, part 247 defining an internal surface 228, the two parts being separated by two lateral shoulders 246, 248 which are symmetrical with one another. Furthermore, each of the free ends 240, 242 of the two half-pieces has a tangential bore 250 fashioned in the thickness of the half-pieces and opening on one side in the external surface 226 and on the other side in the face 252 of the radial sections of the half-pieces. The bores 250 of the free ends 240, 242 are thus respectively adapted to interact in such a way that each pair of bores can receive a screw 254 intended to connect the free ends 240, 242 together.

The screws 254 are each intended to interact with a nut 258 and a thrust washer or collar 256.

Figure 3:
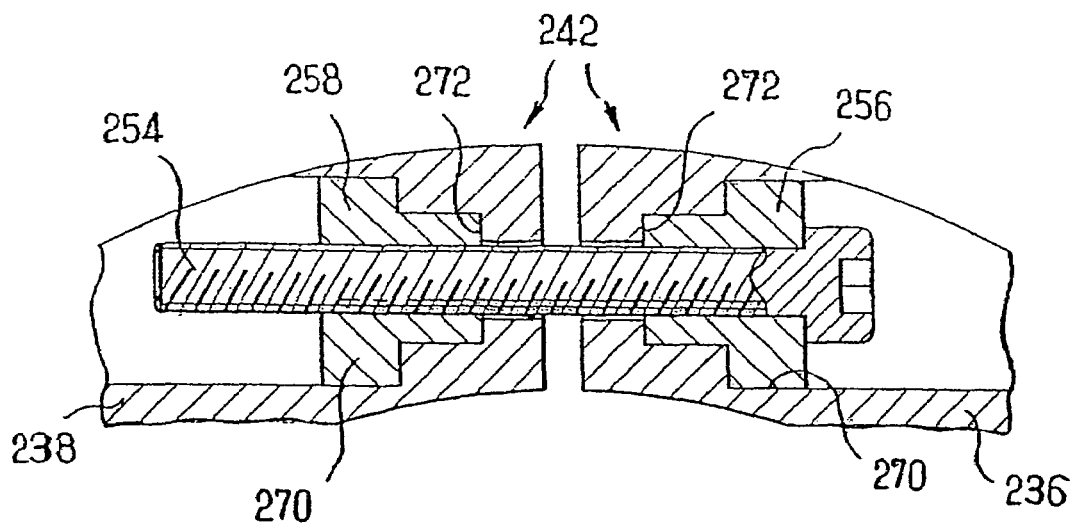
FIG. 3 is a detailed partial diagrammatic view in section of an element of the device illustrated in FIG. 2.

FIG. 3 shows two opposite free ends 242 of the two assembled half-pieces 236, 238 held together by the screw 254 which connects the nut 258 and the collar 256, which draw the two free ends 242 of the half-pieces 236, 238 with them. In order to hold the two pairs of free ends together, the bores 250 of the two free ends 242 have internal shoulders 272 against which the nut 258 and the collar 256 are respectively supported.

In this way, a rigid structure which is clamped around the flowline is formed, and simultaneously the two half-pieces 236, 238 are held in a fixed position in relation to one another at the same time as they are locked radially in opposite directions in relation to one another but also longitudinally.

Figure 4:
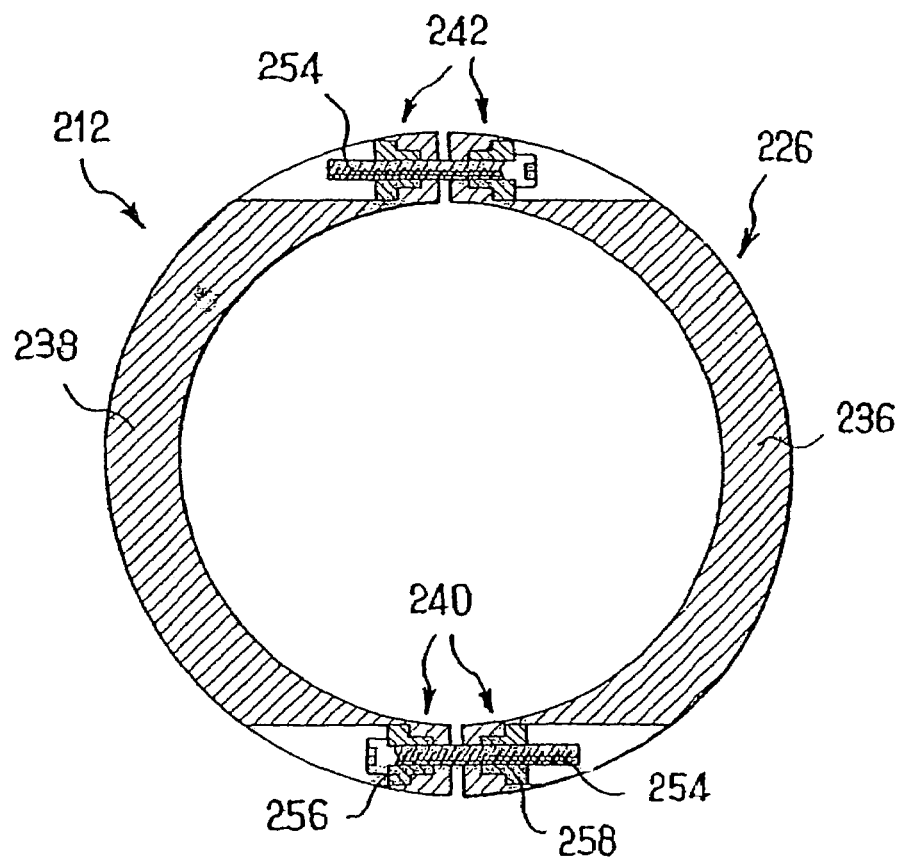
FIG. 4 is a diagrammatic view in section of the device illustrated in FIG. 2 after assembly.

This type of connection makes it possible to hold the annular distance piece 212, shown as a whole in FIG. 4, in a fixed position on the flowline, the two other respective free ends 240 of the two half-pieces 236, 238 being connected together symmetrically in the same way.

Moreover, the screw 254, which is adapted to be rotated by means of a recessed head, is accommodated entirely in the thickness of the annular distance piece 212 so as not to interfere with the support of the external surface 226 against the carrier pipe.

Figure 6:
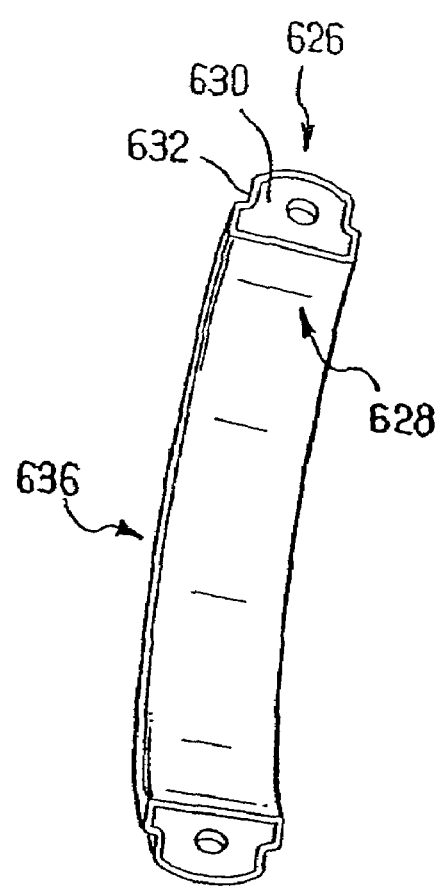
FIG. 6 is a diagrammatic view in section of a device element according to still another mode of implementation.

FIG. 6 illustrates an arc-shaped half-piece 636 intended to be paired in order to form an annular distance piece according to another mode of implementation; the radial section of the half-piece 636 is essentially identical to the radial section of the annular distance piece illustrated in FIG. 1. In contrast, on the annular distance piece shown in FIG. 2, the external surface 626 is less wide than the internal surface 628, which makes it possible to obtain an annular distance piece of which the frictional forces against the flowline are greater than the frictional forces against the carrier pipe.

Figure 5:
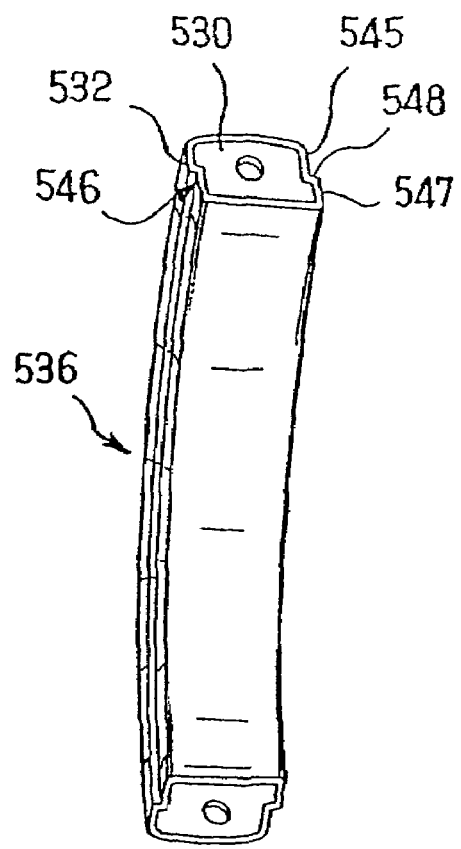
FIG. 5 is a diagrammatic view in section of a device element according to another mode of implementation.

According to still another mode of implementation, illustrated in FIG. 5 which likewise shows an arc-shaped half-piece 536, the radial section is no longer symmetrical but is dissymmetrical. The external and internal parts 545 and 547, which are of essentially the same width here, are staggered longitudinally in relation to one another so as to form two shoulders 546, 548, the support surfaces of which are opposite one another. One 548 is intended to face the carrier pipe, and the other 546 to face the flowline.

In these two modes of implementation according to the invention, illustrated in FIGS. 5 and 6, the half-pieces 536, 636 have a respective element 530, 630 in the form of a half-ring which is made from a material with low heat conductivity and covered with a casing 532, 632 made of plastic material.

The device according to the invention, in all the modes of implementation described above, can be produced by molding the plastic material over the aerogel so as to cover it partially or completely. Furthermore, the nuts and the thrust washers or collars are adapted to be molded over with the aerogel so as to simplify assembly.

However, according to a particular mode of implementation of the invention, only the internal and external surfaces have the plastic material molded over them, the sides of the device remaining free and allowing the aerogel to show. A device with walls which forms a sandwich structure is thus obtained.

With reference to FIGS. 7 to 12, a spacing and centering device according to the invention will now be described in four different variant embodiments.

FIG. 7 shows a radial section of an annular distance piece 712 containing an element 730 consisting of a rigid aerogel. In section, the element 730 has an arc 780 which is extended at the ends by two coaxial portions 782 diverging from one another. Moreover, the element 730 made of aerogel is located between two parts 784 and 786 made of polyamide. Given the fragility of the aerogel, the element 730 is protected in its lower part by a layer 788 of polyamide which is attached or molded over.

According to a second variant, shown in FIG. 8, an annular distance piece 812 comprises on the interior, embedded in the polyamide which surrounds it, an element 830 made of rigid aerogel which in section has a rectilinear side 811 oriented toward the interior of the distance piece 812 and a rounded part 813 oriented toward the exterior. The element 830 extends essentially over the width of the distance piece 812.

FIG. 9 shows an arc-shaped half-piece 936 of a distance piece 912 retained on a flowline 916 according to a third variant embodiment of the invention. The annular distance piece has first projections 915 supported against the flowline 916 which contain an element made of aerogel 930 which is illustrated in section in FIG. 10.

Between the projections 915, the annular distance piece 912 is held at a distance from the flowline 916 so as not to conduct heat energy, and another insulating material is advantageously inserted between the tube 916 and the distance piece 912.

According to a fourth variant illustrated in FIGS. 11 and 12, the projections 1115 of the distance piece 1112 are oriented toward the exterior and they contain an element made of aerogel 1130 which is illustrated in section in FIG. 12. According to this variant, the distance piece is, between the projections, spaced from a carrier pipe (not shown), and the projections are supported against this carrier pipe. As in the previous variant, the space between the carrier pipe and the distance piece can be filled with another insulating material.

The invention claimed is:

1. A spacing and centering device for a rigid pipe-in-pipe, said pipe-in-pipe comprising two coaxial tubes separated by an annular space, said tubes having an extended length,
   said spacing and centering device being accommodated in said annular space between said tubes, having a shorter length than said extended length and said device being operative to hold the two coaxial tubes at a radial distance from one another, said device comprising an element with low heat conductivity in the form of a rigid aerogel, and a casing molded over said aerogel element including said casing being disposed between said element and said two tubes to protect said element from stress applied to said element by said tubes, said casing being comprised of polymer-type plastic material resistant to mechanical stress applied to said casing and said element.

2. The spacing and centering device as claimed in claim 1, wherein said aerogel has an inorganic base.

3. The spacing and centering device as claimed in claim 1, wherein said element is formed in two arc-shaped half-pieces having free ends which are respectively operable to be connected together to comprise the rigid pipe-in-pipe and connectors connecting said free ends.

4. The spacing and centering device as claimed in claim 1, wherein said plastic material is a material resistant to abrasion.

5. The spacing and centering device as claimed in claim 1, wherein said element has a compression strength greater than 10 MPa.

6. A rigid pipe-in-pipe which can be wound up, comprising a plurality of spacing and centering devices as claimed in claim 1, said devices are spaced from one another along said rigid pipe.

7. The rigid pipe as claimed in claim 6, wherein said annular space has a material with low heat conductivity disposed between said spacing and centering devices.

8. The rigid pipe as claimed in claim 6, wherein said spacing and centering devices are spaced by a distance of less than 5 meters.

9. The rigid pipe as claimed in claim 6, wherein its average heat transfer coefficient is less than eleven tenths of the heat transfer coefficient of a portion of pipe in the annulus of which said material with low heat conductivity extends.

* * * * *